(12) United States Patent
Ho (10) Patent No.: US 6,618,219 B1
(45) Date of Patent: Sep. 9, 2003

(54) METHOD AND APPARATUS FOR FEEDFORWARD CANCELLATION USING A PEAK DETECTOR

(75) Inventor: Hai T. Ho, Westminster, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/686,697

(22) Filed: Oct. 11, 2000

Related U.S. Application Data
(60) Provisional application No. 60/158,836, filed on Oct. 12, 1999.

(51) Int. Cl.⁷ ............................................. G11B 5/596
(52) U.S. Cl. .................................................. 360/77.04
(58) Field of Search ......................... 360/77.04, 78.07, 360/78.09, 75; 369/44.25, 44.32

(56) References Cited

U.S. PATENT DOCUMENTS

| | | | |
|---|---|---|---|
| 4,594,622 A | 6/1986 | Wallis | 360/77 |
| 4,940,924 A | 7/1990 | Mizuno et al. | 318/560 |
| 4,947,093 A | 8/1990 | Dunstand et al. | 318/560 |
| 5,072,318 A * | 12/1991 | Yu | 360/77.02 |
| 5,402,400 A | 3/1995 | Hamada et al. | 369/32 |
| 5,541,784 A | 7/1996 | Cribbs et al. | 360/75 |
| 5,793,559 A | 8/1998 | Shepherd et al. | 360/78.09 |
| 5,875,066 A * | 2/1999 | Ottesen | 360/77.11 |
| 5,909,661 A | 6/1999 | Abramovitch et al. | 702/191 |
| 5,949,605 A | 9/1999 | Lee et al. | 360/77.04 |
| 6,002,542 A | 12/1999 | Bruccoleri et al. | 360/77.11 |
| 6,021,017 A | 2/2000 | Asamura et al. | 360/77.14 |
| 6,061,200 A | 5/2000 | Shepherd et al. | 360/77.04 |
| 6,078,460 A | 6/2000 | Moriya | 360/77.04 |
| 6,144,516 A | 11/2000 | Takeda et al. | 360/75 |
| 6,144,517 A | 11/2000 | Watanabe et al. | 360/77.04 |
| 6,421,198 B1 * | 7/2002 | Lamberts et al. | 360/77.04 |
| 6,437,936 B1 * | 8/2002 | Chen et al. | 360/77.04 |
| 6,476,995 B1 | 11/2002 | Liu et al. | 360/75 |
| 6,487,035 B1 * | 11/2002 | Liu et al. | 360/77.04 |

* cited by examiner

Primary Examiner—David Hudspeth
Assistant Examiner—K. Wong
(74) Attorney, Agent, or Firm—Theodore M. Magee; Westman, Champlin & Kelly, PA (57) ABSTRACT

A method and apparatus are provided for generating a feedforward cancellation signal for a next sector of a disc in a disc drive. To form the cancellation signal, the method and apparatus estimate the phase and frequency of a nonrepeatable runout error in a position error signal. A peak detector is then used to identify a peak amplitude of the nonrepeatable runout error for a current sector. Using the peak amplitude, an amplitude is determined for the cancellation signal for the next sector. A time-varying signal is then evaluated based on the estimated phase and frequency and the result of the evaluation is multiplied by the amplitude to produce the cancellation signal.

11 Claims, 6 Drawing Sheets

METHOD AND APPARATUS FOR FEEDFORWARD CANCELLATION USING A PEAK DETECTOR

REFERENCE TO RELATED APPLICATIONS

The present application claims priority from a U.S. Provisional Patent Application having serial No. 60/158,836 filed on Oct. 12, 1999 and entitled METHOD FOR TRACKING REPETITIVE NRRO.

FIELD OF THE INVENTION

The present invention relates to disc drives. In particular, the present invention relates to runout compensation in disc drives.

BACKGROUND OF THE INVENTION

In a computer disc drive, data is stored on a disc in concentric tracks. In disc drives with relatively high track densities, a servo feedback loop is used to maintain a head over the desired track during read and write operations. This is accomplished utilizing prerecorded servo information either on a dedicated servo disc or on angularly spaced sectors that are interspersed among the data on the disc. During track following, the servo information sensed by the head is demodulated to generate a position error signal (PES), which provides an indication of the position error of the head away from the track center. The PES is then converted into an actuator control signal, which is fed back to an actuator to position the head.

In general, there are two forms of head positioning errors: repeatable and non-repeatable. Repeatable errors, which are generally caused by mechanical irregularities in the structure of the disc drive or errors introduced when writing the servo tracks, can be predicted and therefore theoretically can be cancelled out as they occur. In general, these repeatable runout errors (RRO) are removed by introducing a compensation signal into the servo loop that cancels the repeatable positioning error. Techniques for generating such compensation signals are generally referred to as feedforward cancellation.

Feedforward cancellation is much more difficult to implement for nonrepeatable runout errors (NRRO). Unlike repeatable runout errors, nonrepeatable runout errors do not occur with predictable magnitudes, frequencies or phases. In fact, the magnitude, frequency and phase of a nonrepeatable runout error signal generally change with each rotation of the disc.

One system, discussed by Yu in U.S. Pat. No. 5,072,318, attempts to cancel a nonrepeatable runout error by adaptively changing a cancellation signal at each sector of the disc. Specifically, Yu uses a least squares algorithm to adaptively change the frequency, phase, and amplitude of the nonrepeatable runout cancellation signal at each sector.

Because Yu uses a least squares algorithm to determine the amplitude, frequency and phase of the cancellation signal, it takes time for the Yu algorithm to converge on the proper amplitude, frequency and phase. This delay in converging on the amplitude, frequency and phase of the nonrepeatable runout error causes the produced cancellation signal to be less than ideal.

The present invention provides a solution to this and other problems, and offers other advantages over the prior art.

SUMMARY OF THE INVENTION

A method and apparatus are provided for generating a feedforward cancellation signal for a next sector of a disc in a disc drive. To form the cancellation signal, the method and apparatus estimate the phase and frequency of a nonrepeatable runout error in a position error signal. A peak detector is then used to identify a peak amplitude of the nonrepeatable runout error for a current sector. Using the peak amplitude, an amplitude is determined for the cancellation signal for the next sector. A time-varying signal is then evaluated based on the estimated phase and frequency and the result of the evaluation is multiplied by the amplitude to produce the cancellation signal.

DETAILED DESCRIPTION

Figure 1:
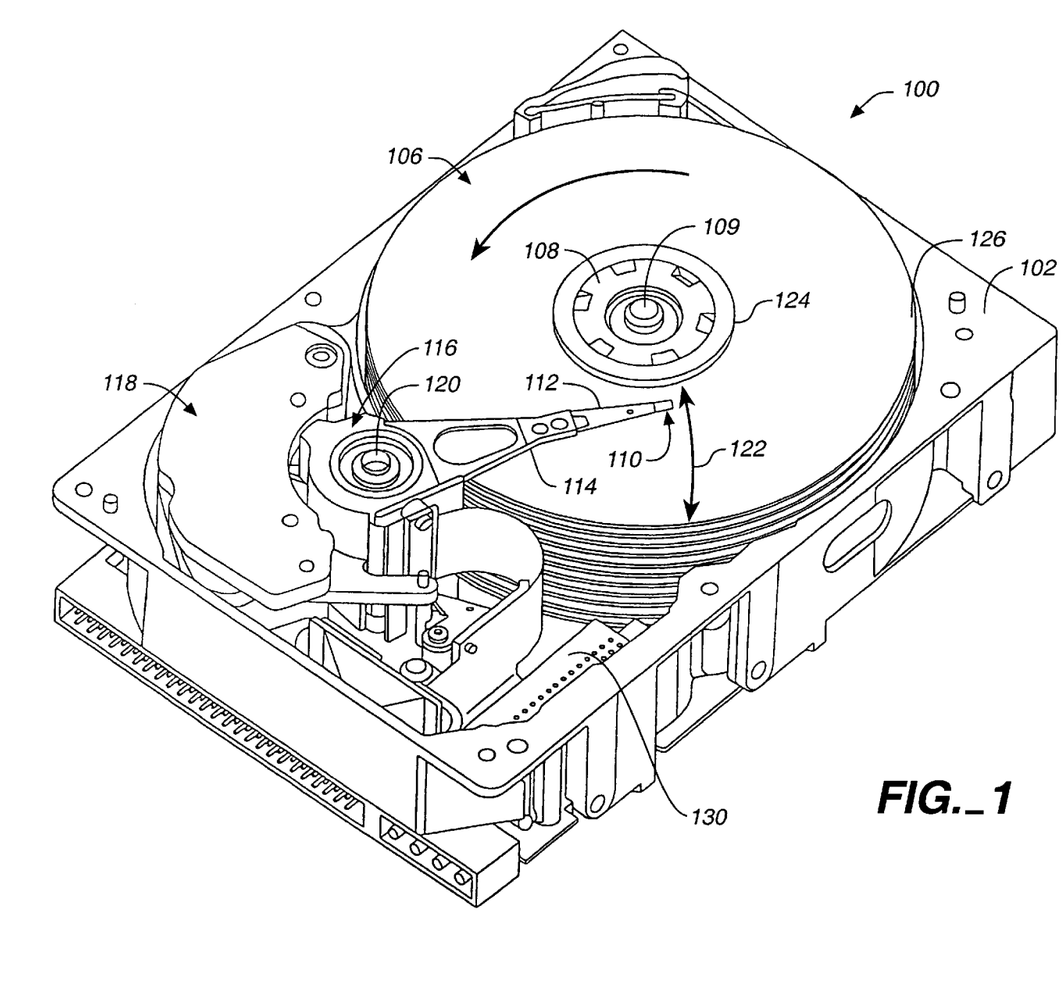
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
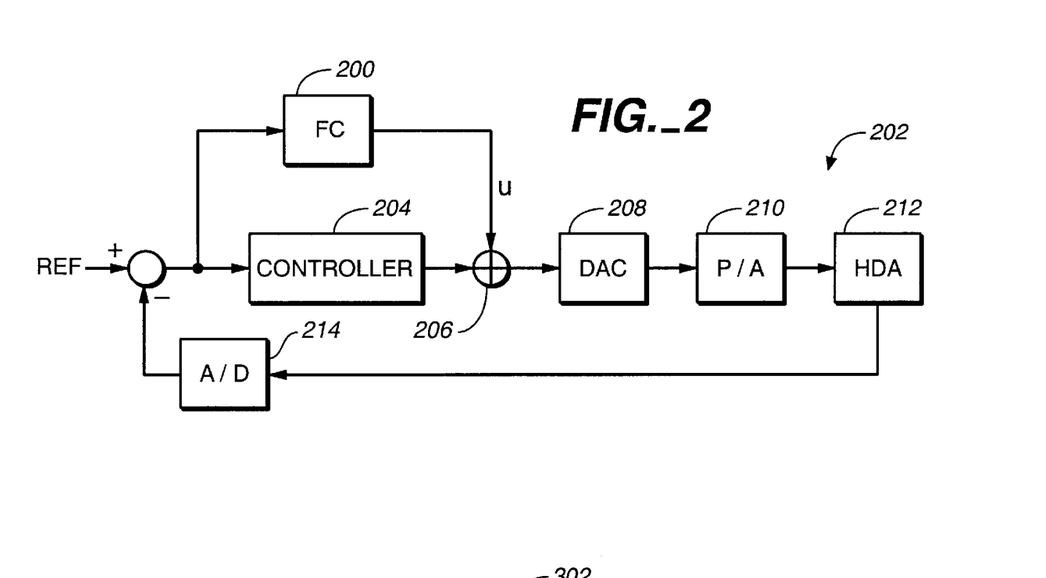
FIG. 2 is a block diagram of a servo loop with a feedforward cancellation system.

FIG. 2 is a block diagram of a feedforward cancellation system 200 in a servo loop 202 that is found in servo electronics 130. Because the precise structure of the servo loop is not significant to the present invention, servo loop 202 is shown in a simplified form. Those skilled in the art will appreciate that servo loops are more complex than the simple diagram of FIG. 2.

In FIG. 2, servo loop 202 includes a servo controller 204 that receives a reference signal (REF) indicating the desired position for a head on the disc. Based on the reference signal, digital controller 204 generates a digital control value that passes through a cancellation summing node 206 (described further below) and into digital-to-analog converter 208. The digital control value is converted into an analog current by digital-to-analog converter 208 and the analog current is amplified by a power amplifier 210 to produce an actuator control current. The actuator control current is provided to a voice coil motor in a head-disc assembly (HDA) 212 and causes the voice coil motor to move based on the magnitude and polarity of the current. As the voice coil motor moves, head-gimbal assemblies attached to the voice coil motor move across the disc thereby changing the positions of the heads relative to tracks on the disc.

Using servo patterns stored on the disc, a head generates an analog signal that indicates the distance from the head to the track center. The analog signal is provided to an analog-to-digital converter 214, which forms a digital signal from the analog signal. The digital signal is then combined with the reference signal to produce a position error signal (PES) that is fed back to controller 204. Controller 204 uses the position error signal to generate a new digital control value. In particular, controller 204 generates a digital value designed to bring the heads toward the desired track position.

The position error signal is also provided to feedforward cancellation component 200, which generates a cancellation signal for the next sector based on the PES of the current sector. This cancellation signal is provided to cancellation summing node 206, which sums the cancellation signal with the control value generated by controller 204.

Figure 3:
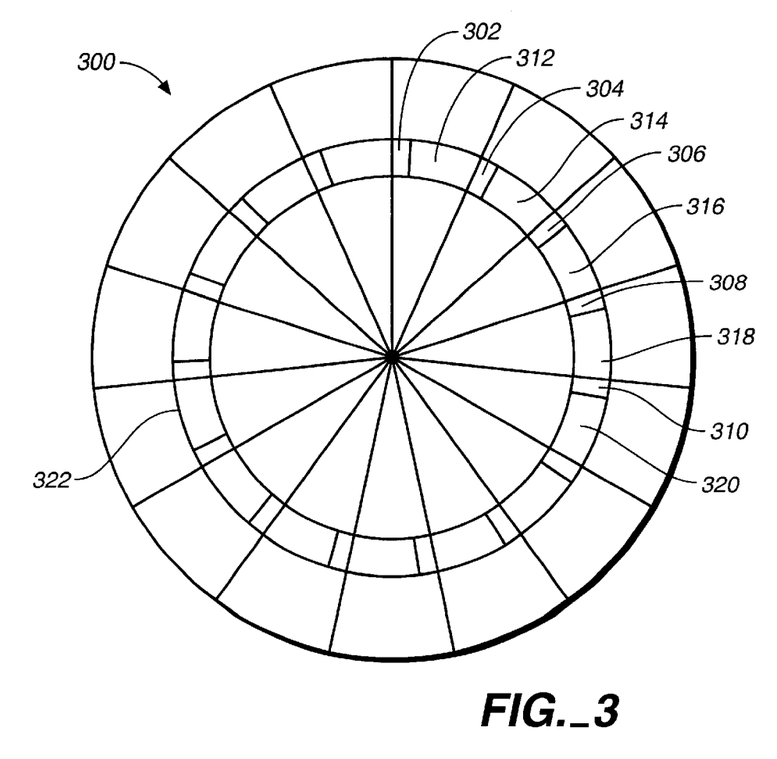
FIG. 3 is a top view of a disc showing a sector layout used in the present invention.

In embedded servo systems, the servo information is stored in sectors along the data track. FIG. 3 provides a top view of a disc 300 showing servo sectors 302, 304, 306, 308, and 310 interspersed among data fields 312, 314, 316, 318, and 320 along a track 322. Note that FIG. 3 is not drawn to scale and that most discs have many more servo fields. For example, in one embodiment of the present invention, there are 120 servo fields per track.

Figure 4:
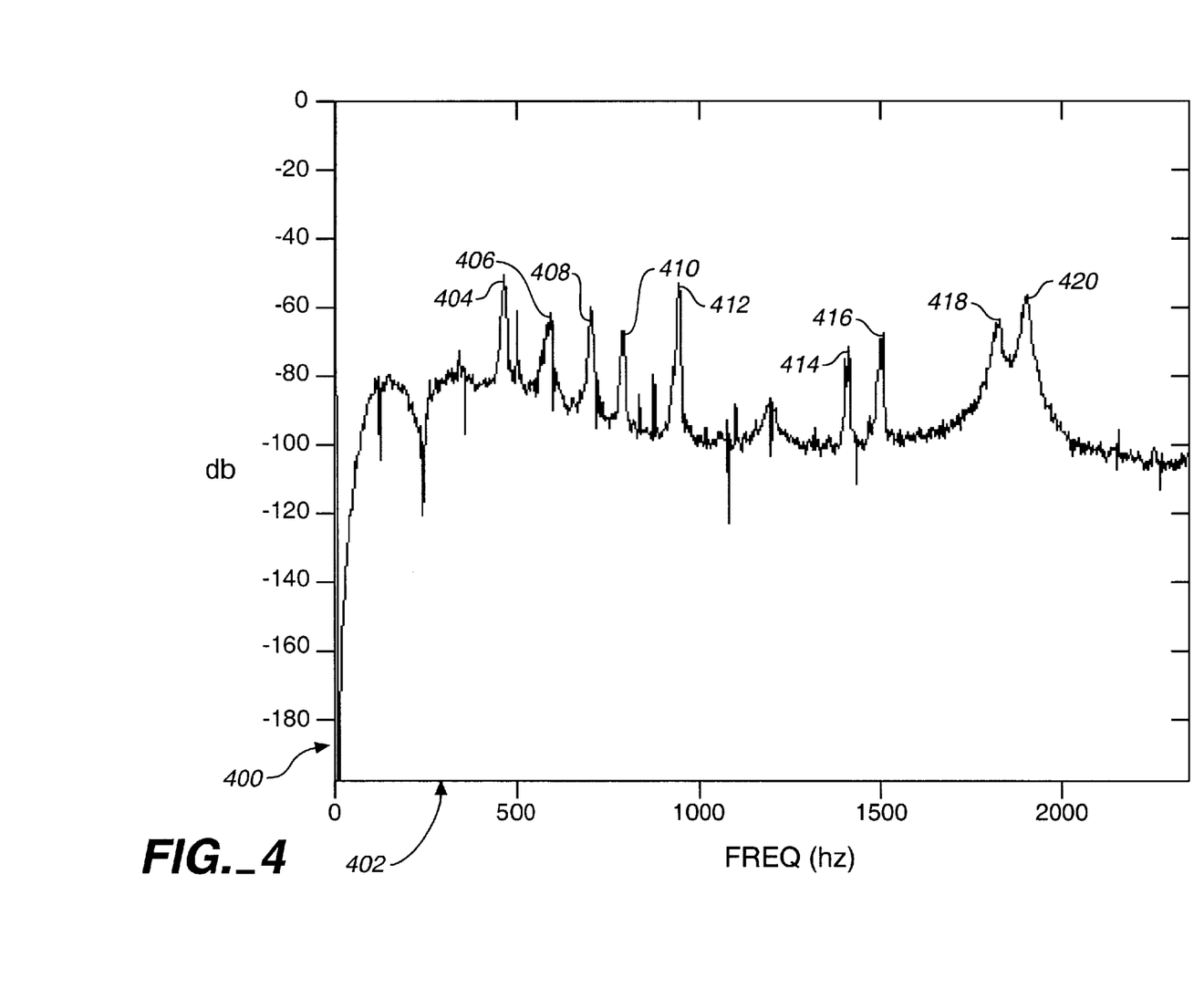
FIG. 4 is a frequency spectrum of a nonrepeatable runout error.

Nonrepeatable runout errors can be seen by examining the frequency spectrum of the position error signal measured over several sectors of the disc. An example of such a spectrum is shown in FIG. 4, where the amplitude of the position error signal is shown in decibels along vertical axis 400 and frequency is shown along horizontal axis 402. In FIG. 4, the different modes of the nonrepeatable runout error appear as peaks 404, 406, 408, 410, 412, 414, 416, 418, and 420 in the spectrum.

The peaks shown in FIG. 4 do not remain fixed. Instead, these peaks shift over time as the frequencies of the individual modes of the nonrepeatable runout errors change. It is this frequency shifting that makes it difficult to cancel nonrepeatable runout errors.

Figure 5:
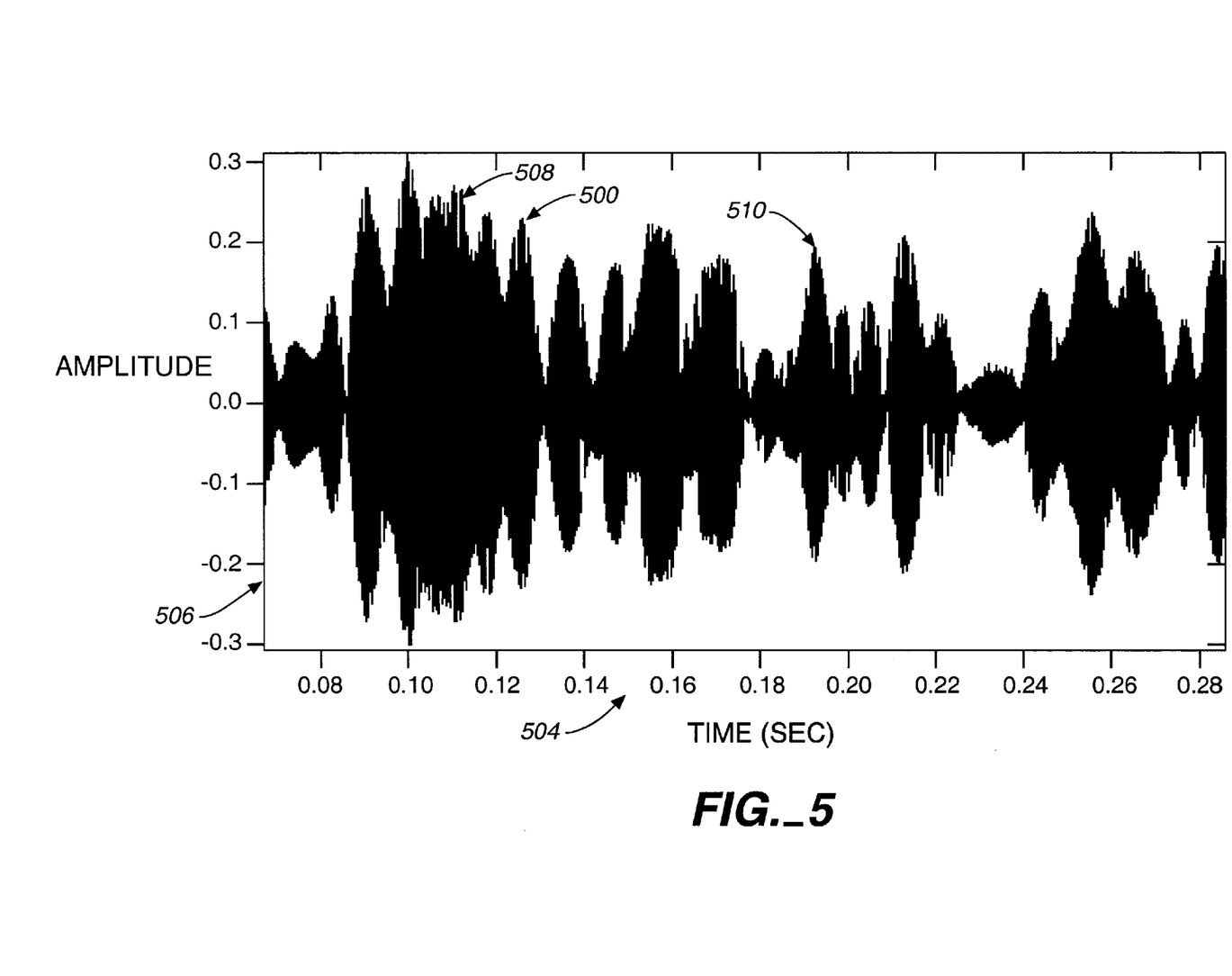
FIG. 5 is a graph of a component of the nonrepeatable runout error over time.
Figure 6:
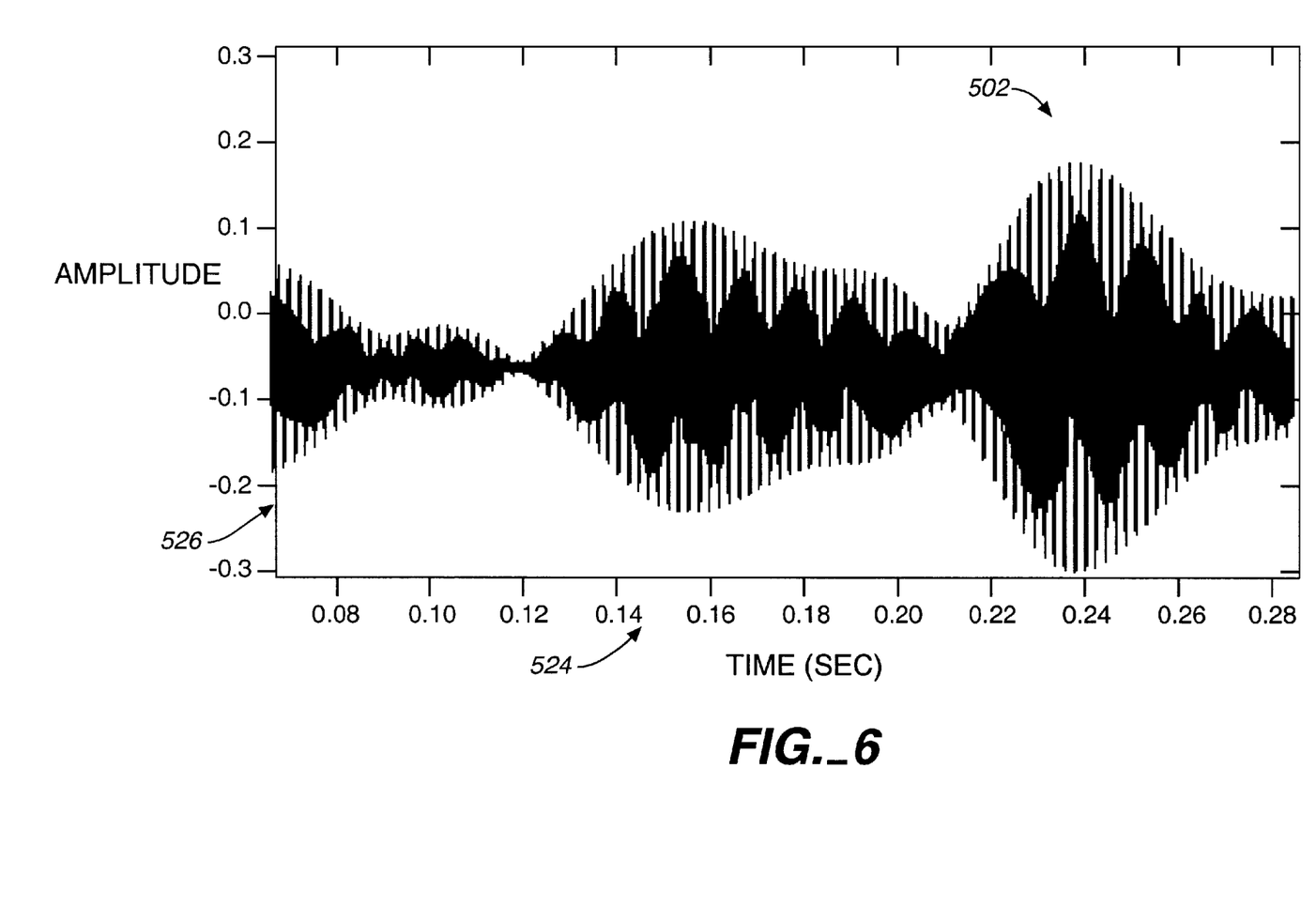
FIG. 6 is a graph of a second component of the nonrepeatable runout error over time.

As shown in FIGS. 5 and 6, the amplitude of each mode of the nonrepeatable errors also changes over time. The changes in the amplitude of the nonrepeatable runout error can be seen in the graphs of FIGS. 5 and 6, which show the amplitude of two modes of the nonrepeatable runout error as a function of time. Mode 500, shown in FIG. 5, represents a 1.7 kilohertz mode of the nonrepeatable runout error and mode 502, shown in FIG. 6, represents a 460 hertz mode of the nonrepeatable runout error. In FIGS. 5 and 6, time is shown along horizontal axes 504 and 524, respectively, and amplitude is shown along vertical axes 506 and 526, respectively. As can be seen in FIGS. 5 and 6, the amplitudes of both modes of the nonrepeatable runout error signal vary considerably as a function of time such that the error signals appear as amplitude modulated signals. For example, peak 508 is much larger than peak 510 for mode 500. Because of this modulation in the amplitude, its difficult to converge quickly on an appropriate cancellation signal under the prior art.

As discussed above, the prior art attempted to track these changes in frequency and amplitude by using adaptive feedforward cancellation to cancel the nonrepeatable runout error. Adaptive feedforward cancellation generates a correction value at each sector that is added to the servo loop. In general, this correction value is calculated as:

$$r(n)=m(n)\cos[w(n)t(n)+\phi(n)] \qquad \text{EQ. 1}$$

where r(n) is the correction value at sector n, m(n) is the amplitude of the nonrepeatable runout cancellation signal at sector n, w(n) is the frequency of the nonrepeatable runout cancellation signal at sector n, t(n) is the time associated with sector n, and φ(n) is the phase of the nonrepeatable runout cancellation signal at sector n.

As discussed above, the prior art uses an adaptive technique to adjust the amplitude, frequency and phase of the nonrepeatable runout cancellation signal. When adaptively changing the amplitude, frequency and phase of the cancellation signal, the prior art does not attempt to measure the amplitude, frequency or phase of the nonrepeatable runout error directly. Instead, the prior art uses the position error signal to generate adaption factors for changing the amplitude, frequency and phase. When generating such adaption values, the prior art must use an adaptive strategy that allows for quick convergence on the new amplitude, frequency and phase of the nonrepeatable runout error while still maintaining stability in the servo system. Because of this, the convergence rate is limited and at times, the nonrepeatable runout is not completely cancelled.

Figure 7:
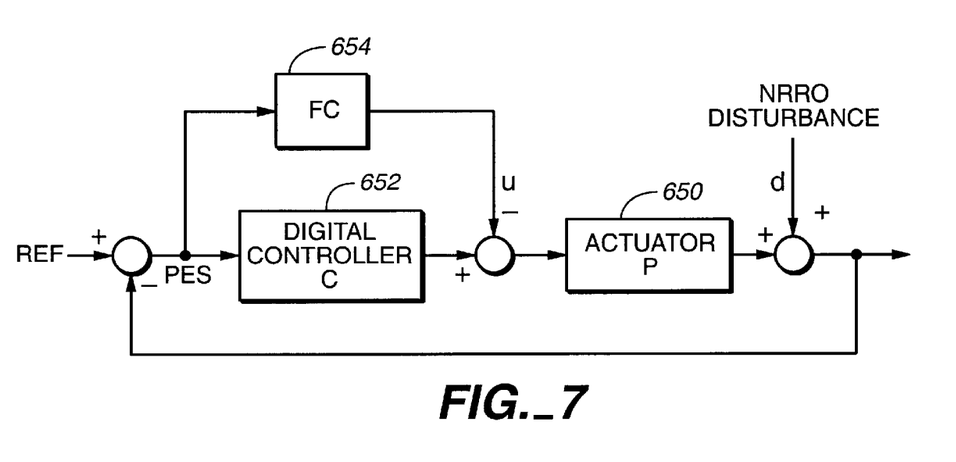
FIG. 7 is a simplified block diagram of a servo loop with feedforward cancellation under the present invention.

The servo loop of FIG. 2 may be simplified by combining elements and assigning a single gain to the combined elements. An example of a simplified block diagram is shown in FIG. 7 where an actuator block 650 with a gain of P is shown in place of digital-to-analog component 208, power amplifier 210, head-disc assembly 212 and analog-to-digital converter 214. Controller 204 of FIG. 2 is shown as controller block 652 in FIG. 7 and has a gain of C. The feedforward cancellation circuit is shown as FC block 654.

In FIG. 7, the non-repeatable runout disturbance is shown as a disturbance d that is added to the position information output by actuator 650. The feedforward cancellation signal is shown as U, which is subtracted from the control signal produced by controller 652.

Figure 8:
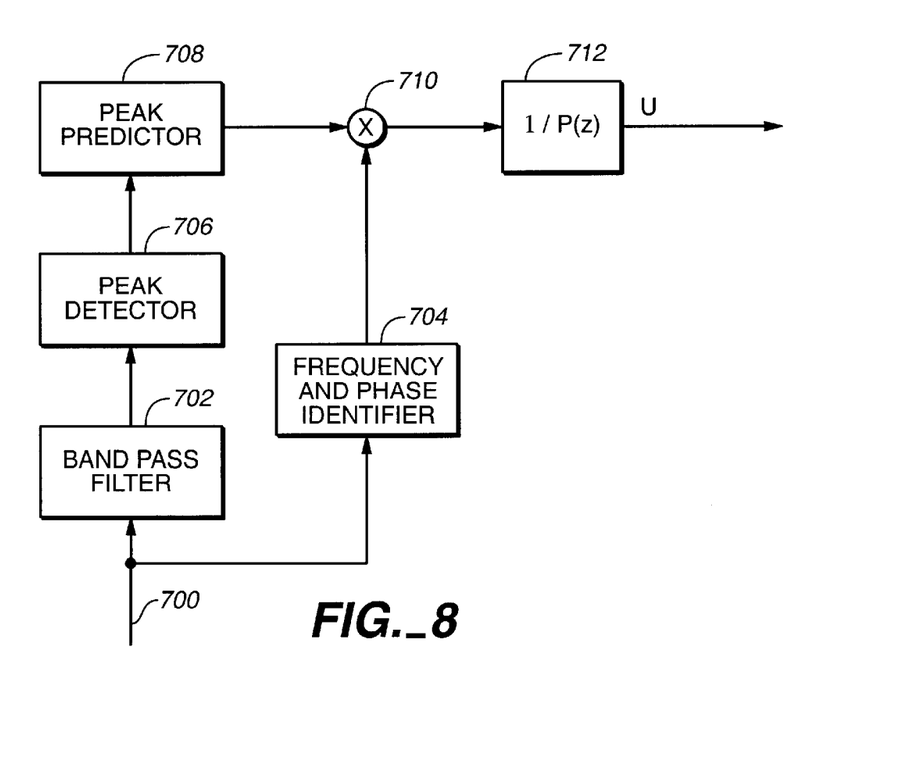
FIG. 8 is a block diagram of a feedforward cancellation system of the present invention.

FIG. 8 provides a block diagram of a feedforward cancellation circuit of the present invention. A position error signal 700 is provided to a band pass filter 702 and a frequency and phase identifier 704. Band pass filter 702 filters the position error signal allowing a band of frequencies to pass to a peak detector 706. In most embodiments, the band of passed frequencies is centered about a nonrepeatable runout frequency that is to be cancelled out by the cancellation circuit of FIG. 8.

Unlike cancellation circuits of the prior art, which attempt to set the amplitude of the cancellation signal using a least squares algorithm, the present invention uses peak detector 706 to identify the current amplitude of the nonrepeatable runout error. Peak detector 706 can be any of a number of known peak detectors using any number of known peak detectors and peak detection methods. For example, the peak detector can take the derivative of the position error signal to identify its peaks in the signal or can compare consecutive values to identify peaks in the signal.

The detected peak of the nonrepeatable runout error signal is provided to a peak predictor 708. Peak predictor 708 estimates a magnitude value for the cancellation signal for the next servo sector based on the peak value detected by peak detector 706. In one embodiment, peak predictor 708 predicts the amplitude value by assuming that the amplitude varies as a sine function. In such embodiments, peak predictor 708 keeps a history of past peaks from previous sectors in order to determine the value of the sine function for the current sector. In other embodiments, peak predictor 708 predicts that the next amplitude for the nonrepeatable runout error signal will be the same as the current amplitude and thus simply passes the value detected by peak detector 706 as the amplitude for the next cancellation signal.

Frequency and phase identifier 704 generate a cosine function that has a frequency and phase that matches the frequency and phase of the nonrepeatable runout error in position error signal 700. Under some embodiments, frequency and phase identifier 704 utilizes a least squares algorithm to converge on the frequency and phase of the nonrepeatable runout error at the current sector. In other embodiments, frequency and phase identifier 704 is a phase lock loop that synchronizes to the nonrepeatable runout error at the current sector. Such a phase lock loop embodiment is discussed in more detail in a U.S. Patent Application Ser. No. 09/86,836 entitled Method and Apparatus for Feedforward Cancellation Using a Phase Lock Loop, and filed on even date herewith.

The amplitude provided by peak predictor 708 and the cosine function provided by frequency and phase identifier 704 are multiplied together by multiplier 710 to produce a cancellation signal. In producing the cosine term and performing the multiplication, frequency identifier 704 and multiplier 710 act together as a cancellation value calculator. The value produced by multiplier 710 is then passed through a gain filter 712. Filter 712 represents the inverse of the gain provided by actuator 650 of FIG. 7. By applying this inverse transform to the calculated cancellation signal, the present invention provides the desired cancellation at the head after the signal has been applied to actuator 650 of FIG. 7. Although it provides certain benefits, filter 712 is not necessary to the practice of the present invention, and those skilled in the art will recognize that it may be removed.

By using peak detector 706 and peak predictor 708, the present invention produces a cancellation circuit that quickly adapts to changes in the amplitude of the nonrepeatable runout signal. In the prior art, an adaptive scheme would be used to adapt to changes in the amplitude of the nonrepeatable runout error signal. However, such adaptive means are inherently slow. As such, the peak detector and peak predictor of the present invention provides a faster means for tracking changes in the amplitude of a nonrepeatable runout error signal. As such, the present invention provides a more accurate cancellation signal for fully canceling nonrepeatable runout error.

In summary, a method is provided for generating a feedforward cancellation signal, U, for canceling nonrepeatable runout error in a disc drive 100. The method includes generating a position error signal 700 based in part on the position of a head 110 relative to a track 322 on a disc 106. A phase and frequency for the cancellation signal U are estimated based in part on the position error signal 700. A peak 508, 510 is detected in the position error signal and is used to estimate an amplitude for the cancellation signal U. The cancellation signal U is then generated based on the estimated phase, frequency and amplitude. A servo system 202 for a disc drive 100 is also provided that includes a controller 652 for generating a control signal based in part on a position error signal 700. An actuator-head assembly 650 that includes an actuator 116 and head 110 is capable of moving the head 110 based at least in part on the control signal from controller 652. The actuator-head assembly 650 is also capable of generating a position error signal 700 based on the position of the head 110 over a track. A feedforward cancellation component 654 receives the position error signal 700 and produces a cancellation signal U. The feedforward cancellation component 654 includes a frequency estimator 704, a peak detector 706 and a value calculator 704, 710. Value calculator 704, 710 evaluates a time-varying function using an estimated frequency produced by frequency estimator 704. Value calculator 704, 710 also multiplies the result of this evaluation by an amplitude estimate generated by peak detector 706. The result of this multiplication is used to form the cancellation signal U.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, the cancellation signal may be inserted at different locations within the servo loop without departing from the scope and spirit of the present invention. Other modifications can also be made.

What is claimed is:

1. A method of generating a feedforward cancellation value for canceling nonrepeatable runout position error in a disc drive, the method comprising steps of:

(a) generating a position error signal based in part on the position of a head relative to a track on a disc in the disc drive;

(b) estimating a phase and frequency for a cancellation signal based at least in part on the position error signal;

(c) detecting a peak in the position error signal;

(d) estimating an amplitude for the cancellation signal from the detected peak; and (e) generating the cancellation value based on the amplitude, phase and frequency for the cancellation signal.

2. The method of claim 1 wherein generating a cancellation value comprises evaluating a trigonometric function based on the phase and frequency and multiplying the trigonometric function by the amplitude.

3. The method of claim 1 wherein the detecting step (c) comprises:

(c)(1) filtering the position error signal to produce a filtered signal; and (c)(2) detecting a peak in the filtered signal.

4. The method of claim 1 comprising a further step of:

(f) passing the cancellation value through a filter having a gain that is the inverse of a gain for an actuator in the disc drive.

5. The method of claim 1 wherein a new cancellation value is determined for each sector of the disc.

6. In a disc drive, a servo system for positioning a head over a track, the servo system comprising:

a controller capable of generating a control signal based in part on a position error signal;

an actuator-head assembly comprising an actuator and the head and capable of moving the head based at least in part on the control signal from the controller and capable of generating a position error signal based on the position of the head over a track; and a feedforward cancellation component capable of receiving a position error signal for a current sector and capable of producing a cancellation signal for a next sector based in part on the position error signal, the feedforward cancellation component comprising:

a frequency estimator capable of estimating the frequency of a nonrepeatable runout error in the position error signal;

a peak detector capable of identifying a peak in the position error signal; and a value calculator capable of generating the cancellation signal at least in part by evaluating a time-varying function using the estimated frequency and multiplying the result of the evaluation by an amplitude that is based on the identified peak in the position error signal.

7. The disc drive of claim 6 wherein the feedforward cancellation component further comprises a filter coupled to the peak detector and capable of providing a filtered position error signal to the peak detector.

8. The disc drive of claim 6 further comprising an amplitude estimator that provides an amplitude for the cancellation signal based on the peak identified by the peak detector.

9. The disc drive of claim 6 further comprising a phase estimator capable of estimating the phase of a nonrepeatable runout error in the position error signal and wherein the time-varying function is evaluated using both the estimated frequency and the estimated phase.

10. The disc drive of claim 6 wherein the time-varying function is a trigonometric function.

11. A disc drive for storing data in tracks along a disc, the disc drive comprising:

a servo loop for positioning a head relative to a track; and feedforward cancellation means coupled to the servo loop for canceling nonrepeatable runout positioning errors using a peak detector.

* * * * *